May 27, 1952     O. F. STERNER     2,598,616
CRATE FOR EGGS OR OTHER SIMILAR PIECE GOODS
Filed Oct. 20, 1950     3 Sheets-Sheet 1

INVENTOR:
O. F. STERNER
By Wenderoth, Lind &
Ponack
ATTORNEYS

May 27, 1952     O. F. STERNER     2,598,616
CRATE FOR EGGS OR OTHER SIMILAR PIECE GOODS
Filed Oct. 20, 1950     3 Sheets-Sheet 2
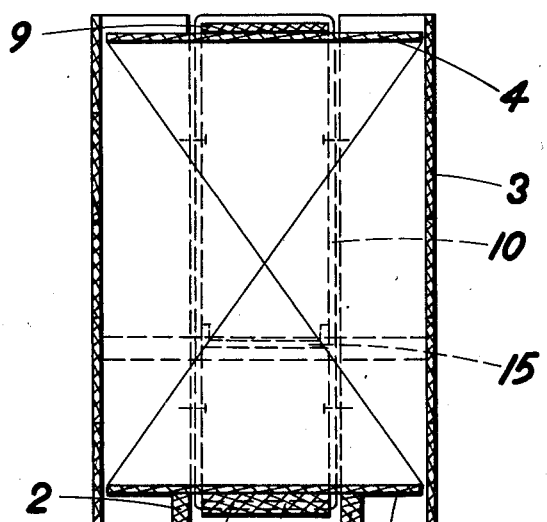
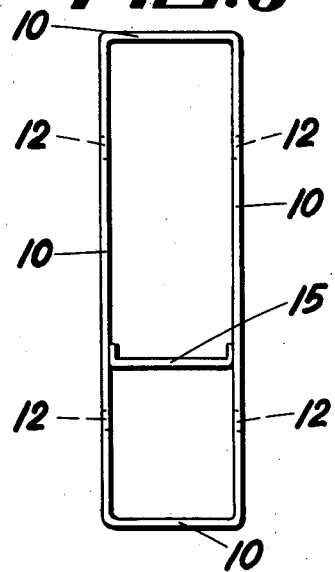
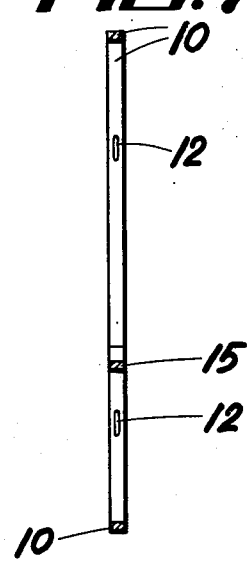
INVENTOR:
O. F. STERNER
By Wenderoth, Lind & Ponack
ATTORNEYS May 27, 1952 — O. F. STERNER — 2,598,616
CRATE FOR EGGS OR OTHER SIMILAR PIECE GOODS
Filed Oct. 20, 1950 — 3 Sheets-Sheet 3
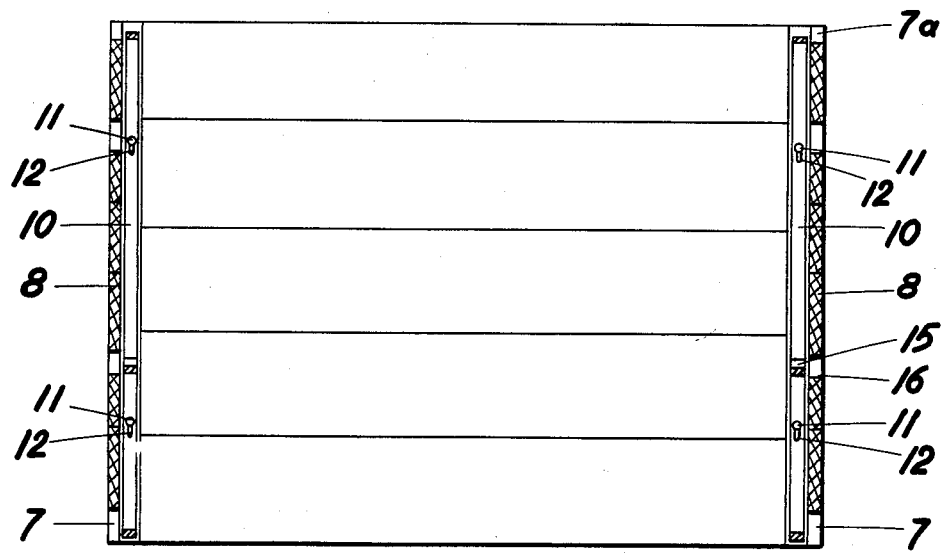
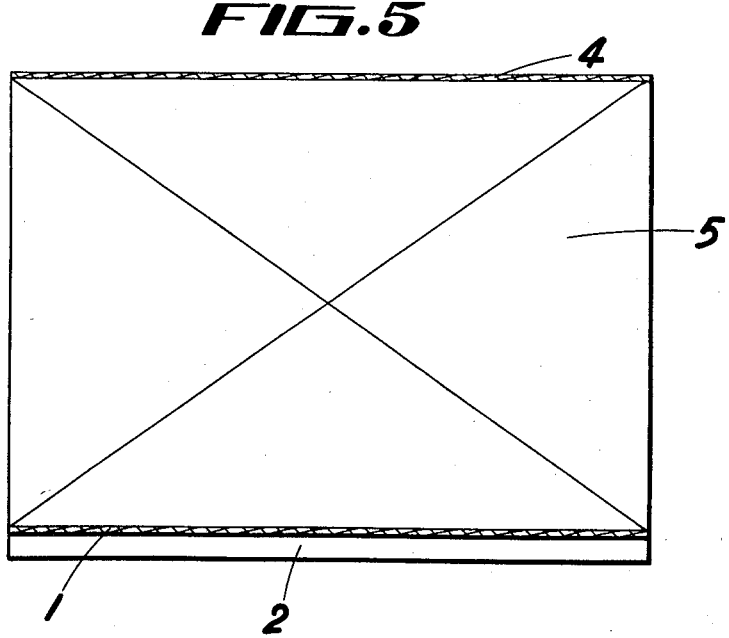
INVENTOR:
O. F. STERNER
By Wenderoth, Lind + Ponack
ATTORNEYS Patented May 27, 1952

2,598,616

UNITED STATES PATENT OFFICE 2,598,616

CRATE FOR EGGS OR OTHER SIMILAR PIECE GOODS

Olof Fredrik Sterner, Overlida, Sweden

Application October 20, 1950, Serial No. 191,207
In Sweden August 24, 1949

4 Claims. (Cl. 217—36)

This invention relates to a crate for eggs or other similar piece-goods and has for its particular object to facilitate the work of collecting and distributing eggs.

Usually, the eggs are collected at each production place from several producers and are then transported to a controlling and storing centre from where they are distributed to the retail business which in turn distributes them to the consumers. On their way from the producers to the consumers the eggs thus have to be moved from one crate to another one or more times. This is a very time-consuming and difficult work inasmuch as the eggs have to be transferred by hand. By the provision of trays having a plurality of recesses or compartments for accommodating the eggs it has been possible to transfer one tray filled with eggs at a time, but in practice it has turned out that when being placed in the customary manner upon one another in the crates said trays are hard to get at, since they must closely abut against the walls of the crates, for which reason said trays cannot be taken out of the crate one after the other. One has tried to avoid this disadvantage by inserting a loose bottom in the crates and lifting the whole pile of trays out of each crate by means of lifting rods which are passed through holes in the bottom of the crate. However, special lifting tools were necessary for this purpose.

The crate according to the invention is so adapted that the above-mentioned disadvantages in transferring the egg trays are avoided. The crate consists of a box-like casing with a bottom plate on which the eggs or the like are placed in layers between trays, the casing being held together by a slat or board extending across its top side and by two opposed assembling and locking members between the ends of this slat or board and the bottom plate. The crate is substantially characterized in that it includes a side wall structure which may be passed as a whole around the bottom plate and the trays thereon and that the assembling and locking members are shaped as quadrilateral frames or provided with loops connecting the ends of said slat or board on the top side of the crate with the ends of a second slat or board which extends in parallel with the first-mentioned one across the underside of the bottom plate, by engaging over the averted sides of the slats or boards so as to lock the side wall structure between them.

For a better understanding of the invention an embodiment thereof will be described more in detail in the following, reference being had to the accompanying drawings, in which—

Fig. 3 is a vertical transverse section thereof.

Fig. 4 is a vertical section through the side wall structure of the crate.

Fig. 5 is a corresponding section through the bottom plate and the top covering of the crate, a pile of egg trays arranged therebetween being diagrammatically shown.

Fig. 6 is a projection of an assembling and locking member.

Fig. 7 is a vertical section through said member taken at right angles to Fig. 6.

Figure 1:
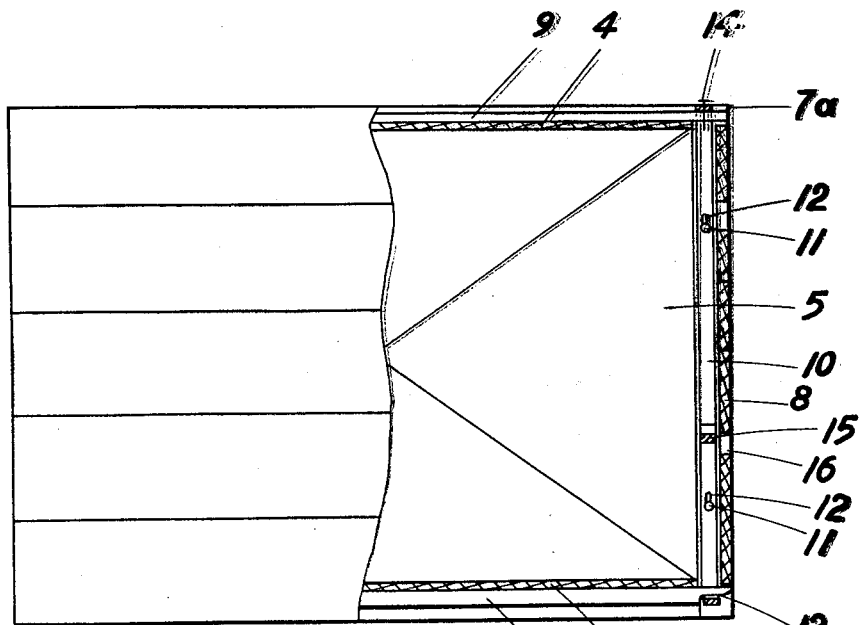
Fig. 1 is a vertical projection of the crate, partly in section.
Figure 2:
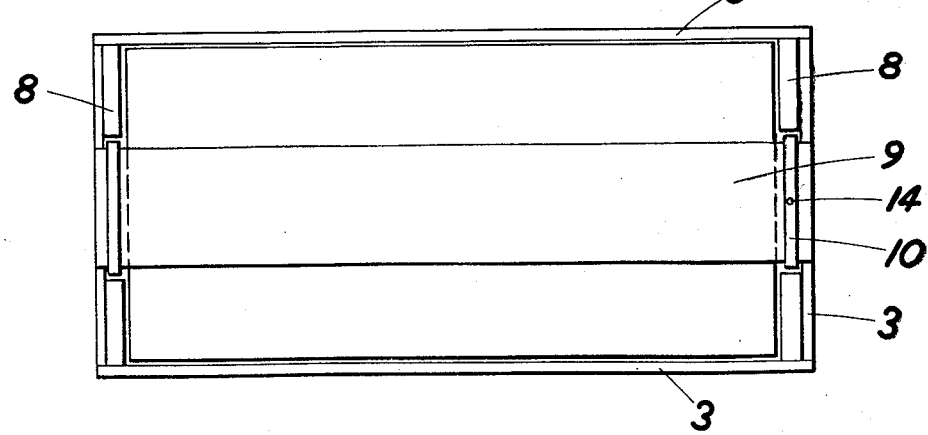
Fig. 2 is a horizontal projection of the crate.

Referring now to the drawings, the crate according to the invention consists of a bottom plate 1, preferably a hard fibre board, which is provided at its underside with two spaced-apart parallel strips 2, and of a side wall structure 3, the walls of which may be whole box walls or have the form of a lattice work. The structure 3 encloses the bottom plate and forms together with the latter a box or open-work crate, as shown in Figs. 1 to 3. Furthermore, the crate has a top covering 4, preferably also a hard fibre board, which fits the frame 3 and rests on a pile 5 of trays having eggs or other similar piece-goods arranged in layers therebetween, said pile being enclosed in the crate. In the drawings the pile 5 is only diagrammatically shown as a unitary block. Arranged across the underside of the bottom plate 1 is a slat or board 6, which lies between the strips 2 serving as guides therefor, and which projects into recesses 7 in two opposed side walls 8 of the structure 3 at the lower end of said walls. A similar transverse slat or board 9 is arranged on the top of the crate. This board 9 rests on the top covering 4 and extends in parallel with the lower board 6 into recesses 7a in the walls 8. Arranged on the inside of each of the side walls 8 is a quadrilateral frame 10 of flat iron (shown separately in Figs. 6 and 7) which lies in a vertically extending recess and is movably guided therein over a distance determined by stops 11 which are mounted on the side walls of the recess and project into slots 12 provided in the adjacent vertical side portions of the frames 10. The stops 11 also serve the purpose of retaining the frames in the recesses of the walls 8. The flat iron frames 10 serve as crate assembling and locking members by engaging over the ends of the boards 6 and 9 at the upper and lower ends of the crate. The lower board 6 is provided at either end with a transverse recess 13 at the underside so that there is formed a shoulder on the board (see Fig. 1), against which the flat iron frame abuts to prevent withdrawal of the board. The upper board 9 may be interlocked with the flat iron frames by means of keys 14 (only one is shown in Fig. 1) which are inserted in registering holes in the flat iron frame and in the board, respectively.

The crate is held safely together by the boards 6, 9 and the flat iron frames 10 when the latter are arranged in the above described manner. When the crate is to be opened, the keys 14 are first removed, whereupon the board 9 is withdrawn. In doing this the flat iron frames 10 fall down as long a distance as the stops 11 and the slots 12 will permit. This is sufficient for the flat iron frames to release the board 6 so that it may be longitudinally withdrawn, guided by the strips 2. This done, the entire side wall structure 3 may be lifted, while the content of the crate is left undisturbed and easily available on the bottom plate 1. Inversely, trays with eggs may be piled up freely on the plate 1, whereafter the side wall structure 3 may be be passed onto the entire unit and the crate may be closed by means of the top covering 4, the flat iron frames 10 and the boards 6 and 9.

Usually, the trays when piled upon one another without any eggs therebetween, reach a lower height than with eggs placed between them. In order that it may be possible to transport the empty crate without the trays being thrown about therein, the flat iron frames are provided at their intermediate portions with a transverse slat 15 serving the purpose of engaging over the ends of the upper board 9 after it has been inserted through openings 16 in the side wall structure 3.

While the crate herein described constitutes a preferred embodiment of the invention, it is to be understood that the invention is not limited to this precise embodiment. For instance, the flat iron frames may be replaced by blades which are provided at both ends with loops, e. g. formed like stirrups, for surrounding the boards. Changes may thus be made in the preferred embodiment without departing from the scope of the invention which is defined in the appended claims.

What I claim and desire to secure by Letters Patent is:

1. A crate for eggs and other similar piecegoods, comprising a box-like casing including a bottom, trays carried by said bottom and adapted to receive eggs in layers between them, a side wall structure surrounding said bottom and said eggs carrying trays, a slat extending across the top of said casing, a second slat extending in parallel with said first-mentioned slat across the underside of said bottom, and two assembling and locking members arranged on opposite sides of said side wall structure between the ends of said first-mentioned slat and said bottom, said assembling and locking members consisting of iron frames movable in vertical guideways provided each in one of two opposed walls of said side wall structure, and adapted to connect the ends of said first-mentioned slat with the ends of said second-mentioned slat by passing around the averted sides of said two slats so as to lock the side wall structure between them.

2. A crate for eggs and other similar piecegoods, comprising a box-like casing including a bottom, trays carried by said bottom and adapted to receive eggs in layers between them, a side wall structure surrounding said bottom and said egg carrying trays, a slat extending across the top of said casing, a second slat extending in parallel with said first-mentioned slat across the underside of said bottom, two assembling and locking members arranged on opposite sides of said side wall structure between the ends of said first-mentioned slat and said bottom, said assembling and locking members consisting of iron frames movable in vertical guideways provided each in one of two opposed walls of said side wall structure, and adapted to connect the ends of said first-mentioned slat with the ends of said second-mentioned slat by passing around the averted sides of said two slats so as to lock the side wall structure between them, and means for interlocking said first-mentioned slat with said side wall structure in a position inserted with its ends under said assembling and locking members.

3. A crate for eggs and other similar piecegoods, comprising a box-like casing including a bottom, trays carried by said bottom and adapted to receive eggs in layers between them, a side wall structure surrounding said bottom and said egg carrying trays, a slat extending across the top of said casing, a second slat extending in parallel with said first-mentioned slat across the underside of said bottom, two assembling and locking members arranged on opposite sides of said side wall structure between the ends of said first-mentioned slat and said bottom, said assembling and locking members consisting of iron frames movable in vertical guideways provided each in one of two opposed walls of said side wall structure, and adapted to connect the ends of said first-mentioned slat with the ends of said second-mentioned slat by passing around the averted sides of said two slats so as to lock the side wall structure between them, and stops mounted on the sides of said vertical guideways and engaging in slots in said iron fromes, said stops being adapted to limit the range of movement of said iron frames and to permit said iron frames after withdrawal of said first-mentioned slat to move downwardly in said vertical guideways, while remaining therein, such a distance as to release said second-mentioned slat from its engagement with said iron frames so that it may be withdrawn.

4. A crate for eggs and other similar piecegoods, comprising a box-like casing including a bottom, trays carried by said bottom and adapted to receive eggs in layers between them, a side wall structure surrounding said bottom and said egg carrying trays, a slat extending across the top of said casing, a second slat extending in parallel with said first-mentioned slat across the underside of said bottom, two assembling and locking members arranged on opposite sides of said side wall structure between the ends of said first-mentioned slat and said bottom, said assembling and locking members consisting of iron frames movable in vertical guideways provided each in one of two opposed walls of said side wall structure, and adapted to connect the ends of said first-mentioned slat with the ends of said second-mentioned slat by passing around the averted sides of said two slats so as to lock the side wall structure between them, stops mounted on the sides of said vertical guideways and engaging in slots in said iron frames, said stops being adapted to limit the range of movement of said iron frames and to permit said iron frames after withdrawal of said first-mentioned slat to move downwardly in said vertical guideways, while remaining therein, such a distance as to release said second-mentioned slat from its engagement with said iron frames so that it may be withdrawn, and a transverse slat at the intermediate portion of each of said iron frames adapted to engage over the ends of said first-mentioned slat to hold together the trays in the crate, when the trays are empty and piled upon one another and reach a level lower than that when eggs are placed between them.

OLOF FREDRIK STERNER.

REFERENCES CITED

The following references are of record in the file of this patent:

UNITED STATES PATENTS

| Number | Name | Date |
| --- | --- | --- |
| 557,120 | Grant | Mar. 31, 1896 |
| 1,663,441 | Clawson | Mar. 20, 1928 |